W. F. BARRON.
NUT LOCK.
APPLICATION FILED JAN. 28, 1908.

899,940.

Patented Sept. 29, 1908.

Witnesses
Hugh H. Ott
K. Allen

Inventor
William F. Barron.

By Victor J. Evans
Attorney

UNITED STATES PATENT OFFICE.

WILLIAM F. BARRON, OF JACKSONBURG, WEST VIRGINIA.

NUT-LOCK.

No. 899,940.　　　　　Specification of Letters Patent.　　　Patented Sept. 29, 1908.

Application filed January 28, 1908. Serial No. 413,084.

*To all whom it may concern:*

Be it known that I, WILLIAM F. BARRON, a citizen of the United States, residing at Jacksonburg, in the county of Wetzel and State of West Virginia, have invented new and useful Improvements in Nut-Locks, of which the following is a specification.

This invention relates to nut locks, and has for its objects to provide simple and improved means whereby a nut will be retained securely in position upon a bolt to which it is applied without danger of working loose, by the rattling of the parts to which the bolt is applied, or, from other causes.

Another object of the invention is to provide a nut having a spring pressed element normally retained from engagement with a longitudinal channel provided upon a bolt, whereby the nut may be screwed tightly against the object it engages, and when in sufficiently tightened position the retaining element is released and adapted to engage the channel of the bolt, thus securely retaining the nut and bolt in an immovable engagement with each other, the retaining element being so constructed as to allow its withdrawal from engagement with the channel when it is desired to separate the nut from the bolt.

To these ends the invention resides in the novel construction and combination of elements hereinafter fully described and claimed.

Figure 1:
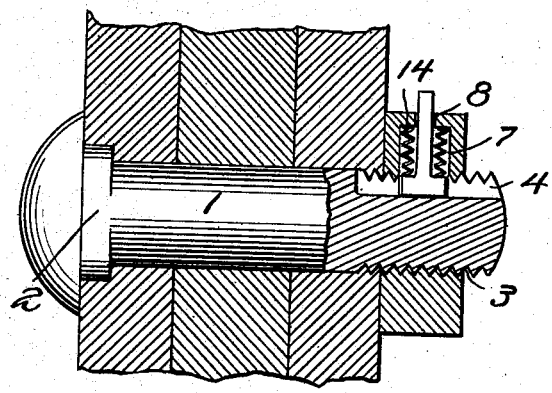
Figure 2:
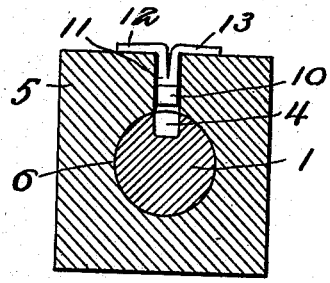
Figure 3:
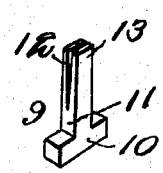

In the drawings, Figure 1 is a partial longitudinal sectional view of a bolt secured by my improved nut lock. Fig. 2 is a longitudinal section through the nut and bolt, showing the retaining element positioned out of the path of the nut whereby the nut is free to rotate upon the bolt. Fig. 3 is a detail perspective view of the locking element.

In the accompanying drawings the numeral 1 designates a bolt of the ordinary construction, having an elliptical portion 2 near its head, and a threaded portion 3. The bolt 1 is provided with a longitudinal slot 4, extending the length of the bolt occupied by the threads 3.

The nut 5 is provided with the usual bolt engaging interiorly threaded apertures 6, and the bolt is also provided at its threaded aperture with an approximately longitudinal upwardly extending chamber 7. The chamber 7 is provided with a smaller squared aperture 8, communicating with the exterior of the nut. The locking element 9 comprises a headed portion 10, of a width correspondingly with that of the chamber 7 of the nut and the slot 4 of the bolt. Extending upwardly from the head 10 of the member 9 is a squared finger 11, approximately of a length slightly greater than the lower wall of the channel and the exterior of the nut. The head 10 of the locking element is of a greater longitudinal length than the projection 11, and is adapted to extend upon each side of the said extension. The extension 11 is of a size approximately equaling that of the aperture 8 provided for the chamber 7, and with which it is adapted to engage. As illustrated in Figs. 2 and 3 of the drawings the extension 11 of the locking element 9 is slit at its free end a certain distance to provide the bifurcated arms 12 and 13.

When the locking element is positioned within the channel 7 of the nut 5, the bifurcated ends 12 and 13 of the member are adapted to project through the opening 8 beyond the outer wall of the nut, the head 10 is positioned within the longitudinal channel 7 of the nut and is retained in a normally downwardly pressed position by a series of springs 14 contacting between the wall provided by the top of the channel and the outer surface of the bolt. The springs engaging the upper faces of the head 10 of the locking element upon each side of the extension 11. When the device is adapted to be secured upon a bolt, the locking element is drawn upward out of the path of contact of the teeth of the bolt and the bifurcated ends 11 and 12 are spread away from each other over the side of the bolt upon which the aperture 8 is positioned, thus allowing for the screwing of the nut upon the bolt. When the nut has been screwed into position upon the bolt, the arms 11 and 12 are bent backward into their normal position, and the springs 14 acting upon the head 10 forces the locking element downward and into engagement with the channel 4 of the bolt, thus effectively securing the nut and bolt together. When the locking element is in secured position within the longitudinal slot 4 of the bolt the bifurcated fingers 12 and 13 project sufficiently above the surface of the bolt to allow them to be grasped and thus raise the head of the locking element out of engagement with the bore of the bolt and permit the separation of the two members when so desired.

The locking element 9 is preferably constructed of brass or other malleable material whereby oxidation from rust will not occur to bind the locking element and the nut together, the nut, it being understood, being preferably constructed of iron.

From the above description it will be seen that I have constructed a simple and effective means for retaining a nut in locked position upon a bolt, the parts of which being so arranged as to perform their functions easily and with certainty, one in which the nut may be screwed to its full capacity upon a bolt without interfering with the locking device carried by the bolt, and in which the locking device is so constructed and arranged as to be readily withdrawn from its engagement with the bolt when desired, whereby the nut and the bolt may be readily separated.

Having thus fully described the invention what is claimed as new is:

The combination with a bolt having a longitudinal groove, of a nut having a central bore and a non-circular chamber within the nut and communicating with the bore, the nut having an aperture communicating with the chamber and one of its faces, and a locking element comprising a body portion adapted to be positioned within the chamber and a projecting portion having a bifurcated end adapted to extend through the aperture beyond the face of the nut, and to be bent away from each other over the face of the nut to retain the body of the locking element out of contact with the teeth of the bolt, and springs within the chamber acting upon the body of the locking element and adapted to force the said body of the locking element into engagement with the channel of the bolt when the bifurcated fingers are straightened to their normal position, the said fingers being of a length so as to project beyond the face of the nut when the nut and bolt are locked together.

In testimony whereof I affix my signature in presence of two witnesses.

WILLIAM F. BARRON.

Witnesses:
  H. R. JOHNSTON,
  DAY BLAND.